United States Patent
Nishimura

(10) Patent No.: US 7,245,391 B2
(45) Date of Patent: Jul. 17, 2007

(54) FACSIMILE DEVICE SELECTING TRANSMISSION METHOD APPROPRIATE FOR EACH TRANSMISSION

(75) Inventor: Shinichi Nishimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 757 days.

(21) Appl. No.: 09/843,177

(22) Filed: Apr. 26, 2001

(65) Prior Publication Data
US 2002/0051222 A1 May 2, 2002

(30) Foreign Application Priority Data
Apr. 28, 2000 (JP) ............................ 2000-129161
Mar. 23, 2001 (JP) ............................ 2001-085351

(51) Int. Cl.
G06K 15/00 (2006.01)
H04N 1/00 (2006.01)
H04M 1/00 (2006.01)
G06F 15/16 (2006.01)

(52) U.S. Cl. .................... 358/1.15; 358/1.16; 358/402; 379/93.07; 379/100.01; 709/217

(58) Field of Classification Search .............. 358/1.15, 358/1.16, 402, 406, 426.16, 449; 379/93.07, 379/93.09, 93.14, 100.01, 100.08, 100.15; 709/217
See application file for complete search history.

(56) References Cited

U.S. PATENT DOCUMENTS

| 6,058,169 A * | 5/2000 | Bramnick et al. ..... 379/100.01 |
| 6,625,646 B1 * | 9/2003 | Kamanaka et al. ......... 709/224 |
| 6,700,674 B1 * | 3/2004 | Otsuka et al. ............. 358/1.15 |

FOREIGN PATENT DOCUMENTS

| JP | 10065866 | 3/1998 |
| JP | 10107938 | 4/1998 |
| JP | 10243019 | 9/1998 |
| JP | 11215338 | 8/1999 |

\* cited by examiner

Primary Examiner—King Y. Poon
Assistant Examiner—Thomas J. Lett
(74) Attorney, Agent, or Firm—Cooper & Dunham LLP

(57) ABSTRACT

A facsimile device, which can switch a transmission method between an electronic-mail transmission method and a real-time transmission method for each transmission, is provided. The facsimile device includes an electronic-mail control unit used for transmitting image information in an electronic-mail format to a destination through a computer network, a real-time network control unit used for transmitting the image information to the destination while the facsimile device and the destination are connected on line through the computer network, and a transmission specifying unit specifying one of the electronic-mail control unit and the real-time network control unit as a communication control unit in accordance with a destination address of the destination. The facsimile device transmits the image information to the destination address by use of the communication control unit specified by a user through the transmission specifying unit.

18 Claims, 9 Drawing Sheets

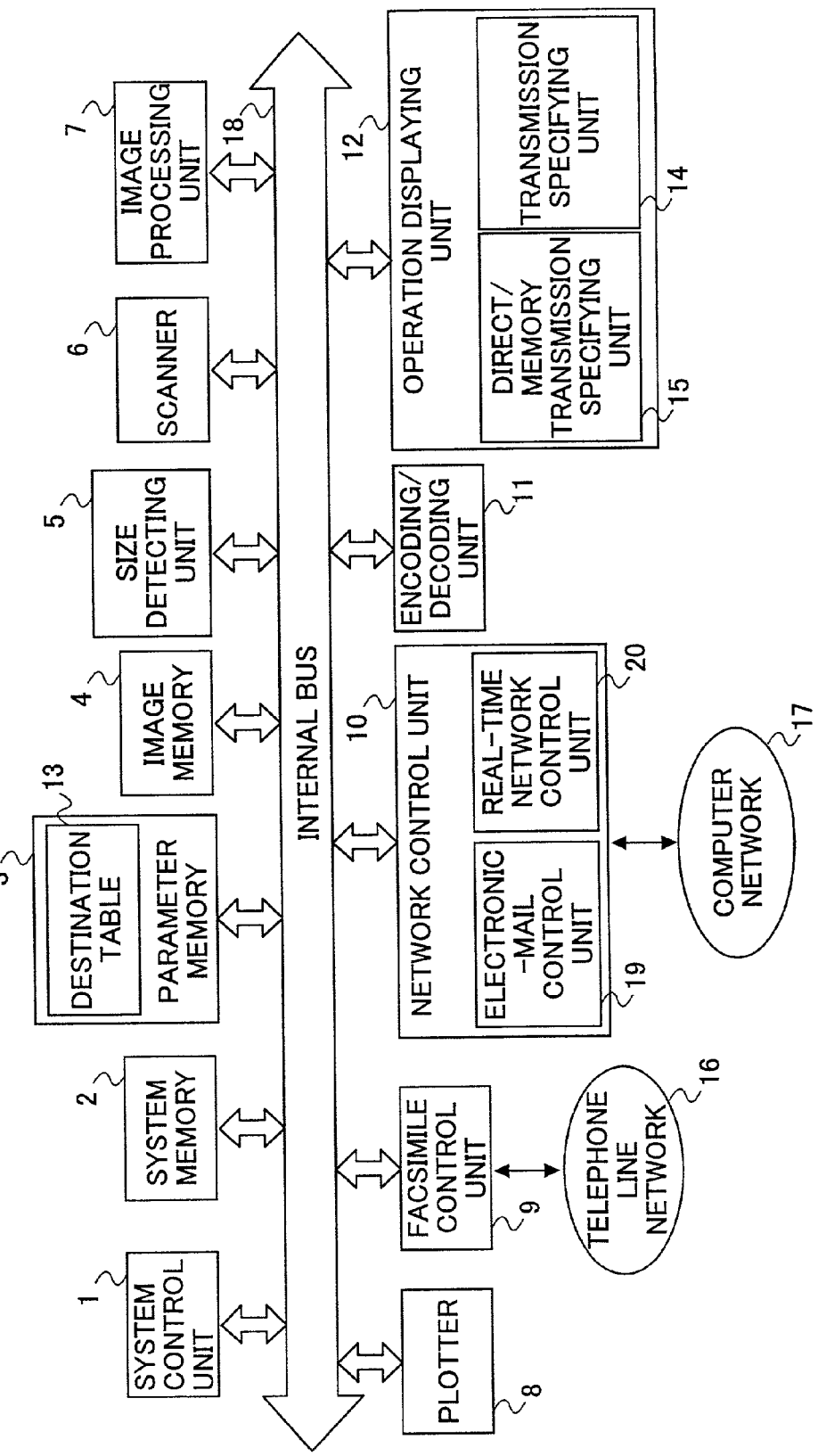

FIG.2A

| STATION NAME | TELEPHONE NUMBER | NETWORK ADDRESS |
|---|---|---|
| ZZZcorp. | 046-234-**** | zzz@atugi.co.jp |

FIG.2B

| SPEED/ONE-TOUCH DIALING | NAME | DESTINATION (TELEPHONE) NUMBER | DESTINATION (NETWORK) ADDRESS | TRANSMISSION METHOD |
|---|---|---|---|---|
| ONE-TOUCH 01 | AAA | | *.*.111.222 | REAL TIME |
| ONE-TOUCH 02 | BBB | 045-678-**** | | |
| ONE-TOUCH 03 | CCC | | CCC@ehim.co.jp | ELECTRONIC MAIL |
| SPEED 01 | DDD | 299-234-**** | | |
| SPEED 02 | EEE | | eee@osak.co.jp | ELECTRONIC MAIL |
| SPEED 03 | FFF | 0234-56-**** | | |

FIG.4

| SPEED/ONE-TOUCH DIALING | NAME | DESTINATION (TELEPHONE) NUMBER | DESTINATION (ELECTRONIC MAIL) ADDRESS | DESTINATION (REAL TIME) ADDRESS |
|---|---|---|---|---|
| ONE-TOUCH 01 | AAA | 03-5411-** | aaa@toky.co.jp | *.***.123.111 |
| ONE-TOUCH 02 | BBB | 045-678-** | | *.***.111.222 |
| ONE-TOUCH 03 | CCC | | CCC@ehim.co.jp | |
| SPEED 01 | DDD | 099-234-** | ddd@kago.co.jp | *.***.1.2 |
| SPEED 02 | EEE | | eee@osak.co.jp | *.*.25.123 |
| SPEED 03 | FFF | 0234-56-**** | | |

FACSIMILE DEVICE SELECTING TRANSMISSION METHOD APPROPRIATE FOR EACH TRANSMISSION

BACKGROUND OF THE INVENTION

1. Field of the Invention

The present invention generally relates to a facsimile device, and more particularly relates to a method of specifying a transmission method carried out by a facsimile device having a communication function to exchange image information with another party through a telephone line network and a computer communication network by following a certain facsimile transmission procedure.

2. Description of the Related Art

A related-art facsimile device exchanges image information with another party through a telephone line network by following a certain facsimile transmission procedure. In detail, a facsimile device (a transmitter) on an information transmitting side exchanges information about device after exchanging information about device capabilities with a facsimile device (a receiver) on an information receiving side, and, then, transmits image information to the receiver by using a main scanning size, a resolution, an encoding method and colors (black and white, or colors) that are receivable by the receiver.

In recent years, a facsimile device has been in practical use that has a function to transmit or receive image information through a computer network such as a local area network (LAN) and the Internet. Facsimile communication methods through the computer network are, for instance, a "STORE AND FORWARD" type (an electronic-mail type) defined in the ITU-T T.37 recommendation and a "REAL TIME" type (a real-time type) defined in the ITU-T T.38 recommendation.

According to the electronic-mail type facsimile communication method, image information is transmitted as a file attached to electronic mail. On the other hand, according to the real-time type facsimile communication, the transmitter exchanges information about device capabilities with the receiver, transmits image information, and confirms a delivery to the receiver while the transmitter is connected to the receiver through the computer network similarly to the facsimile communication through the telephone line network.

The facsimile communication through the telephone line network has advantages over the facsimile communication through the computer network in terms of security, reliability and immediateness, but has a high communication cost as its disadvantage. On the other hand, the facsimile communication through the computer network also has an advantage over the facsimile communication through the telephone line network, in which a communication cost of the facsimile communication through the computer network is cheaper than that of the facsimile communication through the telephone line network. However, the facsimile communication through the computer network has certain disadvantages in terms of the security, reliability, and immediateness.

The real-time type facsimile communication through the computer network has advantages over the electronic-mail type facsimile communication through the computer network, because the real-time facsimile communication enables optimization on a paper size, a resolution and a method of encoding image information, and immediate confirmation on image-information transmission. However, many facsimile devices do not still have a real-time type communication capabilities. In addition, the real-time type facsimile communication has certain disadvantages having a possibility that communication between the transmitter and the receiver fails because image information transmitted from the transmitter cannot pass through a network firewall located on the receiver's side. Furthermore, the real-time type facsimile communication has a possibility that communication between the transmitter and the receiver fails because of a delay problem in a response from the receiver, since a server and the like exist between the transmitter and the receiver.

A transmission through either the telephone line network or the computer network is determined by an operator for a related-art facsimile device that can communicate through both of the telephone line network and the computer network. However, it is a troublesome to select one of the telephone line network and the computer work for transmitting image information by the operator. Additionally, every advantage of the related-art facsimile device cannot be utilized occasionally because of the operator selecting one of the telephone line network and the computer network.

In related-art technologies, facsimile devices that can communicate through both a telephone line network and a computer network are disclosed in, for example, Japanese Laid-open Patent Applications No. 10-65866, No. 10-107938, No. 10-243019, and No. 11-215338.

A facsimile device disclosed in Japanese Laid-open Patent Application No. 10-65866 is connectable to both a telephone line network and a computer network, and includes a telephone-number conversion table, to which a plurality of groups are registered, each group including a destination number of the other party (a destination) on the telephone line network and a destination address of the other party on the computer network. If a specified destination number of the other party is registered in the telephone-number conversion table in a case of transmitting image information to the other party, the facsimile device obtains a destination address corresponding to the specified destination number from the telephone-number conversion table, and transmits the image information to the destination address through the computer network.

Japanese Laid-open Patent Application No. 10-107938 discloses an image transmission system and a server used in the image transmission system. The image transmission system is a system forming a computer network, and connecting each terminal device on the computer network through the server. A terminal device (a transmitting terminal) on an image transmitting side connects to the computer network through a server including the transmitting terminal, and specifies a terminal device (a receiving terminal) on an image receiving side. The receiving terminal is connected to the computer network through a server including the receiving terminal. Subsequently, the transmitting terminal transmits image data by using a format appropriate for the computer network to the receiving terminal. The receiving terminal reproduces an image from the image data received through the computer network.

Additionally, Japanese Laid-open Patent Application No. 10-243019 discloses a data communication device connectable to a telephone line network and a computer network, and including a registering unit that registers groups of a destination number of the other party on the telephone line network and a destination address of the other party on the computer network. In a case in which a destination registered in the registering unit is specified for transmitting data, the data communication device performs communication through the telephone line network in a direct transmission mode, and communication through the computer network in a memory transmission mode. Alternatively, the data communication device performs communication through the computer network in a half-tone mode, and communication through the telephone line network in a text mode. Alternatively, the data communication device performs communication through the computer network if a communication size of information to be transmitted is large, and performs communication through the telephone line network if the communication size is small. Alternatively, the data communication device performs communication through the computer network if a requested time for ending communication is short, and performs communication through the telephone line network if the requested time is long. Additionally, the data communication device communicates through the telephone line network instead of the computer network if communication through the computer network is failed.

Additionally, Japanese Laid-open Patent Application No. 11-215338 discloses a facsimile device connectable to a telephone line network and a computer network. The facsimile device is capable of registering groups of a destination number of the other party on the telephone line network and a destination address of the other party on the computer network. In addition, the facsimile device at each destination having registered its destination number and destination address can register priority information indicating a priority order of the destination number and the destination address. The facsimile device decides a transmission method by use of the priority information in a case of transmitting data to the destination having registered both of its destination number and destination address. The facsimile device also displays the priority information registered at the destination in a case in which the destination having registered both of its destination number and destination address is selected, and has means for changing the priority information before transmitting data to the destination.

Additionally, a facsimile device designed previously by the applicant of the present invention includes a facsimile-communication control unit, an electronic-mail communication control unit, a real-time network communication control unit, and a destination table. The facsimile communication control unit transmits image information through a telephone line network. The electronic-mail communication control unit transmits the image information by using a format of electronic mail through a computer network. The real-time network communication control unit transmits the image information while being connected to the other party through the computer network. The facsimile device registers, in the destination table, a group of a destination number dialed through the telephone line network and a destination address connected through the computer network, for each destination.

The facsimile device initially transmits the image information through the computer network by use of the real-time network communication control unit in a case in which both a destination number and a destination address are registered in the destination table for a destination specified by a transmission operation. If the transmission of the image information through the computer network by use of the real-time network communication control unit is failed, the facsimile device selects the facsimile-communication control unit or the electronic-mail communication control unit for transmitting the image information, according to a resolution of reading a document. Alternatively, if the transmission of the image information through the computer network by use of the real-time network communication control unit is failed, the facsimile device selects the facsimile-communication control unit or the electronic-mail communication control unit for transmitting the image information, according to a document size.

The above-described facsimile device disclosed in Japanese Laid-open Patent Application No. 10-65866 transmits the image information through the telephone line network if the communication through the computer network is failed. However, this facsimile device cannot switch its communication method between the electronic-mail type and the real-time type, in accordance with a user's request.

Additionally, the image transmission system disclosed in Japanese Laid-open Patent Application No. 10-107938 enables the real-time facsimile communication through the computer network, but cannot switch its facsimile communication method between the real-time type and the electronic-mail type, in accordance with a user's request.

Additionally, the data communication device disclosed in Japanese Laid-open Patent Application No. 10-243019 cannot use the real-time facsimile communication efficiently, and cannot switch its facsimile communication method between the real-time type and the electronic-mail type, in accordance with a user's request.

Additionally, the facsimile device disclosed in Japanese Laid-open Patent Application No. 11-215338 cannot switch its facsimile communication method between the real-time type and the electronic-mail type, in accordance with a user's request.

Additionally, the facsimile device designed previously by the applicant of the present invention initially transmits the image information to the destination address through the computer network by use of the real-time network communication control unit. Thus, the facsimile device cannot initially select an electronic-mail communication using the electronic-mail communication control unit, if it is known that a facsimile device at the destination does not correspond to real-time network communication. Consequently, the facsimile device wastes electricity and time, as well as increases a network load.

SUMMARY OF THE INVENTION

Accordingly, it is a general object of the present invention to provide a facsimile device used for transmitting image information to its destination. A more particular object of the present invention is to provide a facsimile device that can specify a transmission method between an electronic-mail transmission method and a real-time transmission method, in accordance with requests from a user to select the electronic-mail transmission method if it is known that a facsimile device at a destination does not have a real-time communication ability, and to select the real-time transmission method for transmitting the most appropriate image information to the destination by exchanging communication-ability information or for performing delivery confirmation immediately.

The above-described object of the present invention is achieved by a facsimile device that transmits image information to a destination, including an electronic-mail control unit used for transmitting the image information in an electronic-mail format to the destination through a computer network, a real-time network control unit used for transmitting the image information to the destination while the facsimile device and the destination are connected on line through the computer network, and a transmission specifying unit specifying one of the electronic-mail control unit and the real-time network control unit as a communication control unit in accordance with a destination address of the destination, wherein the facsimile device transmits the image information to the destination address by use of the communication control unit specified by the transmission specifying unit in a case in which the destination address is selected.

Yet, another object of the present invention is to provide a facsimile device that can omit a process performed by a user to specify a transmission method between an electronic-mail transmission method and a real-time transmission method.

The above described object of the present invention is achieved by a facsimile device that transmits image information to a destination, including an electronic-mail control unit used for transmitting the image information in an electronic-mail format to the destination through a computer network; a real-time network control unit used for transmitting the image information to the destination while the facsimile device and the destination are connected on line through the computer network; and a destination table, to which a destination address and a transmission method are registered respectively for each destination and each destination address, the destination address being used for transmitting the image information through the computer network, the transmission method indicating one of the electronic-mail control unit and the real-time network control unit, wherein the facsimile device transmits the image information to the destination address by use of either the electronic-mail control unit or the real-time network control unit indicated by the transmission method if the destination address is specified as the destination.

Yet, another object of the present invention is to provide a facsimile device that can share a unit specifying a transmission method between an electronic-mail transmission method and a real-time transmission method, with other functions of the facsimile device.

The above-described object of the present invention is achieved by a facsimile device that transmits image information to a destination, including a facsimile control unit used for transmitting the image information to the destination through a telephone line network by following a fixed facsimile transmission procedure; an electronic-mail control unit used for transmitting the image information in an electronic-mail format to the destination through a computer network; a real-time network control unit used for transmitting the image information to the destination while the facsimile device and the destination are connected on line through the computer network; and a direct/memory transmission specifying unit specifying a transmission method in accordance with a destination address of the destination, for each destination, the transmission method indicating one of direct transmission and memory transmission, wherein the direct/memory transmission specifying unit can further specify usage of the electronic-mail control unit or the real-time network control unit for each transmission method, and the facsimile device transmits the image information to the destination by use of either the electronic-mail control unit or the real-time network control unit corresponding to the transmission method if the destination address is selected.

As described above, the present invention improves convenience of the facsimile device and reduces a cost of the facsimile device.

Other objects, features and advantages of the present invention will become more apparent from the following detailed description when read in conjunction with the accompanying drawings.

BRIEF DESCRIPTION OF THE DRAWINGS

FIG. 1 is a block diagram showing a facsimile device according to a first embodiment of the present invention;

FIGS. 2A and 2B are tables respectively showing a station information table and a destination table, which are registered in the facsimile device according to the first embodiment;

FIG. 4 is a table showing the destination table registered in a facsimile device according to a second embodiment of the present invention;

DESCRIPTION OF THE PREFERRED EMBODIMENTS

Figure 3:
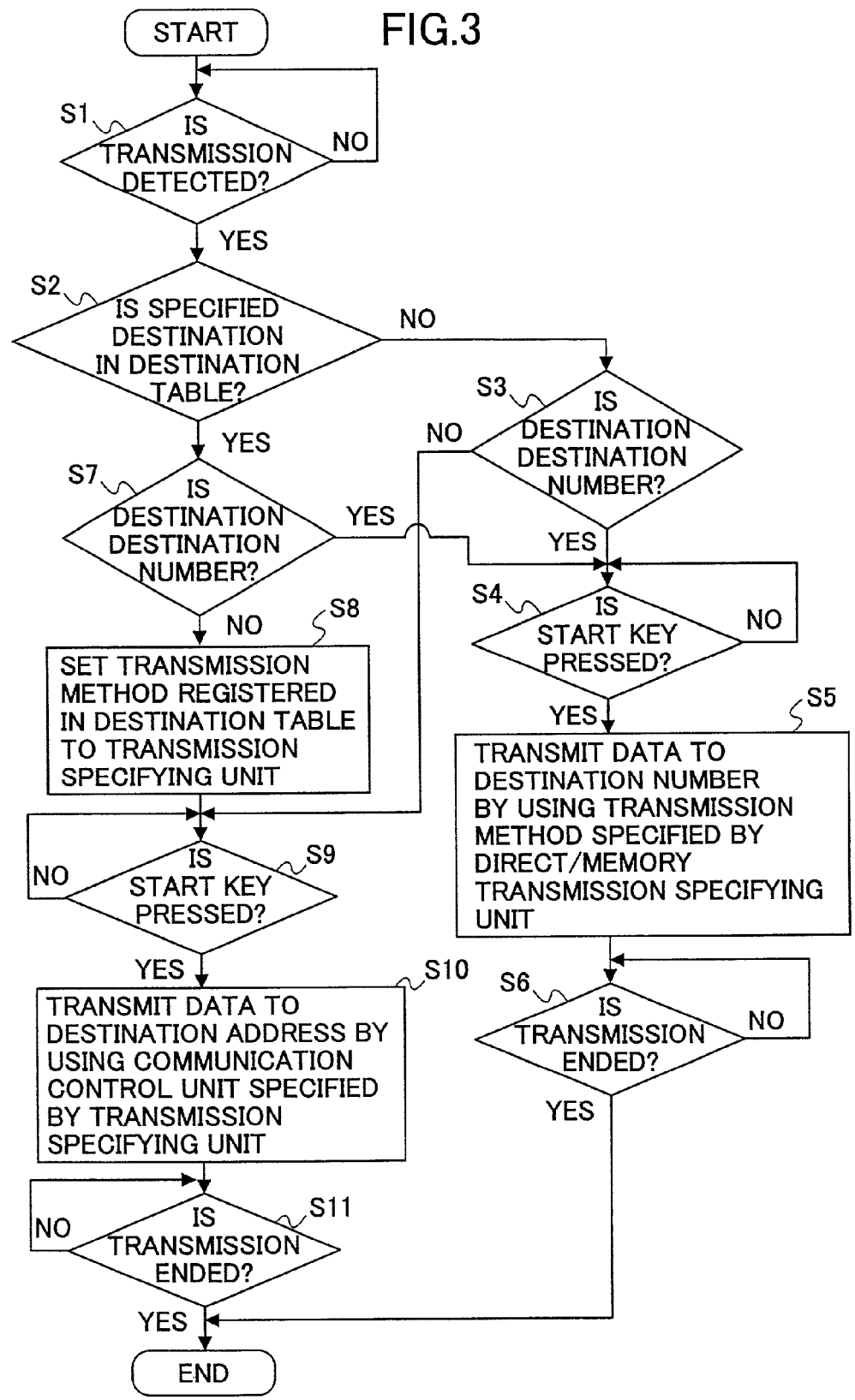
FIG. 3 is a flowchart showing processes performed by the facsimile device according to the first embodiment.

A description will now be given of preferred embodiments of the present invention, with reference to the accompanying drawings.

FIG. 1 is a block diagram showing a facsimile device according to a first embodiment of the present invention. The facsimile device shown in FIG. 1 includes a system control unit 1, a system memory 2, a parameter memory 3, an image memory 4, a document-size detecting unit (a size detecting unit) 5, a scanner 6, an input-image processing unit (an image processing unit) 7, a plotter 8, a facsimile-communication control unit (a facsimile control unit) 9, a network-communication control unit (a network control unit) 10, an encoding/decoding unit 11, an operation displaying unit 12, and an internal bus 18. The parameter memory 3 includes a destination table 13. The network-communication control unit 10 is connected to a computer network 17, and includes an electronic-mail communication control unit (an electronic-mail control unit) 19 and a real-time network communication control unit (a real-time network control unit) 20. The operation displaying unit 12 includes a network-transmission-method specifying unit (a transmission specifying unit) 14, and a direct-transmission/memory-transmission specifying unit (direct/memory transmission specifying unit) 15. The facsimile-communication control unit 9 is connected to a telephone line network 16.

FIGS. 2A and 2B are tables respectively showing a station information table and the destination table 13, which are registered in the facsimile device according to the first embodiment.

The system control unit 1 included in the facsimile device shown in FIG. 1 controls each unit in the facsimile device. The system memory 2 stores a control program executed by the system control unit 1 and various data and the like necessary for executing the control program, and is used as a work area for the system control unit 1.

The parameter memory 3 stores a variety of information peculiar to the facsimile device. In detail, the parameter memory 3 includes the station information table and the destination table 13, as shown respectively in FIGS. 2A and 2B. The facsimile device registers its station name, telephone number and network address in the computer network 17, in the station information table. Additionally, the facsimile device registers a name, and a destination number on the telephone line network 16 or a destination address on the computer network 17, for each destination in the destination table 13. The facsimile device also can register a transmission method that is either transmission using the electronic-mail communication control unit 19 or transmission using the real-time network communication control unit 20, for a destination whose destination address (network address) is registered in the destination table 13.

The image memory 4 is used for encoding image information, and for decoding encoded image information, and stores a large quantity of encoded image information. The document-size detecting unit 5 detects a sheet size of a document to be read. The scanner 6 reads a document image. The input-image processing unit 7 creates an image file to be transmitted by processing a document-image reading signal supplied from the scanner 6. The plotter 8 outputs an image by using a fixed size and resolution.

The operation displaying unit 12 includes a variety of operation keys and displaying devices, and is used for operating the facsimile device. The operation displaying unit 12 further includes the network-transmission-method specifying unit 14, and the direct-transmission/memory-transmission specifying unit 15. The network-transmission-method specifying unit 14 is used for specifying usage of the electronic-mail communication control unit 19 or the real-time network communication control unit 20, for transmitting image information through the computer network 17. The direct-transmission/memory-transmission specifying unit 15 is used for specifying direct transmission or memory transmission, for transmitting image information through the telephone line network 16 by use of the facsimile-communication control unit 9. The encoding/decoding unit 11 encodes an image signal, and decodes encoded image information to its original image signal.

The facsimile-communication control unit 9 exchanges image information with the other party through the telephone line network 16 by following a fixed facsimile transmission procedure. The network-communication control unit 10 exchanges various data with the other party through the computer network 17. The network-communication control unit 10 converts a format of image information data to a format appropriate for the computer network 17, and converts the format of the image information data back from the format appropriate for the computer network 17. Additionally, the network-communication control unit 10 includes the electronic-mail communication control unit 19 and the real-time network communication control unit 20. The electronic-mail communication control unit 19 carries out electronic-mail communication through the computer network 17. The real-time network communication control unit 20 carries out real-time communication through the computer network 17.

Additionally, each unit included in the facsimile device is connected to the internal bus 18, and exchanges data with other units mainly through the internal bus 18.

FIG. 3 is a flowchart showing processes performed by the facsimile device according to the first embodiment, and includes steps S1 through S11.

At the step S1 shown in FIG. 3, the system control unit 1 determines whether transmission is detected. If the transmission is detected at the step S1, the system control unit 1 proceeds to the step S2, and checks whether a destination specified through the operation displaying unit 12 is actually specified from the destination table 13. If it is determined at the step S2 that the specified destination is not specified from the destination table 13, the system control unit 1 proceeds to the step S3, and checks whether the specified destination is expressed in a destination number for dialing through the telephone line network 16.

If it is determined at the step S3 that the destination is not expressed in the destination number, but in a destination address for transmitting through the computer network 17, the system control unit 1 proceeds to the step S9. Preceding the step S9, a user can specify usage of the electronic-mail communication control unit 19 or the real-time network communication control unit 20 for transmitting image information, by using the network-transmission-method specifying unit 14.

On the other hand, if it is determined at the step S3 that the destination is expressed in the destination number, the system control unit 1 proceeds to the step S4, and checks whether a start key is pressed. If the start key is pressed at the step S4, the system control unit 1 transmits the image information to the destination number through the telephone line network 16, by use of the facsimile-communication control unit 9 and a transmission method specified by the direct-transmission/memory-transmission specifying unit 15, at the step S5. At the step S6, the system control unit 1 checks whether the transmission is completed. If it is determined at the step S6 that the transmission is completed, the facsimile device finishes the above-described processes.

On the other hand, if it is determined at the step S2 that the specified destination is actually specified from the destination table 13, the system control unit 1 proceeds to the step S7, and checks whether the specified destination is expressed in the destination number. If it is determined at the step S7 that the specified destination is expressed in the destination number, the system control unit 1 proceeds to the step S4. On the other hand, if it is determined at the step S7 that the specified destination is expressed in the destination address, the system control unit 1 proceeds to the step S8.

At the step S8, the system control unit 1 sets a network transmission method corresponding to the destination address specified from the destination table 13 to the network-transmission-method specifying unit 14, and displays the network transmission method. A user can switch the network transmission method between transmission using the electronic-mail communication control unit 19 and transmission using the real-time network communication control unit 20, by using the network-transmission-method specifying unit 14. After the start key is pressed at the step S9, the system control unit 1 transmits the image information to the destination address through the computer network 17 by using one of the electronic-mail communication control unit 19 and the real-time network communication control unit 20, which is specified by the network-transmission-method specifying unit 14, at the step S10. At the step S11, the system control unit 1 checks whether the transmission is completed. If it is determined at the step S11 that the transmission is completed, the facsimile device finishes the above-described processes.

According to the first embodiment described above, a user can specify a transmission method through the computer network 17 if necessary, by using the network-transmission-method specifying unit 14. Additionally, by registering a transmission method, that is, either an electronic-mail transmission method or a real-time transmission method, for each destination address in the destination table 13, and setting the transmission method to the network-transmissionmethod specifying unit 14 based on correspondence of the destination address and the transmission method, the facsimile device can omit a process to specify a transmission method for each transmission. Additionally, the facsimile device displays a transmission method registered in the destination table 13, and, thus, a user can confirm the transmission method registered in the destination table 13.

As a modification of the first embodiment, the facsimile device can ask a user to input a destination address from the operation displaying unit 12 if a transmission method used for transmitting image information through the computer network 17 is not registered in the destination table 13, and can analyze the destination address inputted by the user. If the destination address inputted by the user is a network address, for instance, on an intra-office network that does not have a firewall setting, the facsimile device uses the real-time network communication control unit 20 for transmitting the image information to its destination. On the other hand, if the destination address is an address on an outside-company network that has a possibility to have a firewall setting, the facsimile device uses the electronic-mail communication control unit 19 for transmitting the image information to its destination.

By constructing the facsimile device as described above, the facsimile device can transmit the image information to its destination by the real-time transmission method, if an inputted destination address is an address, to which the facsimile device can transmit the image information by the real-time transmission method. In addition, the facsimile device can confirm the transmission of the image information to its destination.

As another modification of the first embodiment, the facsimile device can register a transmission method for each fixed condition, in a condition table. If a fixed condition is detected, the facsimile device transmits image information to its destination by taking a transmission method corresponding to the fixed condition in the condition table as a first priority over other transmission methods.

In detail, usage of the electronic-mail transmission method may be set for a case in which a document size detected by the document-size detecting unit 5 is "A4", in the condition table. If a destination address is specified, and a document size of a document to be transmitted is detected as A4, the facsimile device transmits the document as data to the destination address by using the electronic-mail communication control unit 19. By constructing the facsimile device as described above, a document received by a receiving side can be outputted by use of an A4-size if a size of the document transmitted from a transmitting side is A4, since a device on the receiving side must have an ability to receive an A4-size document if the device can perform an electronic-mail communication.

As another condition, the real-time transmission method may be set corresponding to a case in which a destination address is a local address inside an intra-office network, in the condition table. Additionally, the electronic-mail transmission method may be set corresponding to a case in which the destination address is an address outside a company, in the condition table. The facsimile device transmits image information to a specified destination address by using the real-time network communication control unit 20 if the specified destination address is a local address. On the other hand, if the specified destination address is an address outside the company, the facsimile device transmits the image information to the specified destination address by using the electronic-mail communication control unit 19. Accordingly, the facsimile device can speedily transmit the image information to a network such as the intra-office network that does not have a firewall setting, as well as can accurately transmit the image information to an address outside the company without being disturbed by a firewall.

Additionally, the real-time transmission method may be used for transmitting image data read from a document, if a data size of the image data is greater than a predetermined data size. On other hand, the electronic-mail transmission method may be used for transmitting the image data, if the data size of the image data is less than or equal to the predetermined data size. The facsimile device transmits image data read from a document to a destination address by using the real-time network communication control unit 20, if the destination address is specified, and the data size of the image data is greater than the predetermined data size. On the other hand, the facsimile device transmits the image data to the destination address by using the electronic-mail communication control unit 19, if the destination address is specified, and the data size of the image data is less than or equal to the predetermined data size. Accordingly, the facsimile device can stop transmitting electronic mail, to which large-size data is attached, and, thus, can reduce a network load.

Additionally, a degree of significance of a document may be inputted to the facsimile device through the operation displaying unit 12. The real-time transmission method may be set corresponding to a case in which a confidential transmission or a special delivery of the document is specified, in the condition table. The facsimile device transmits the document to a destination address by using the real-time network communication control unit 20, if the destination address, and the confidential transmission or the special delivery of the document are specified. Accordingly, the facsimile device can verify whether the document is transmitted to the destination address correctly, and, thus, can transmit a document having a high degree of significance to the destination address accurately.

Additionally, the telephone line network 16 may be used instead of the computer network 17, if a communication condition of the computer network 16 is poor. The electronic-mail transmission method may be set corresponding to a case in which a line to the other party is busy when using the real-time transmission method, in the condition table. The facsimile device transmits image information through the telephone line network 16 by using the facsimile-communication control unit 9, if the facsimile device cannot communicate with the other party through the computer network 17 because of a poor communication condition of the computer network 17 when attempting to transmit the image information by following a setting in the destination table 13 after the destination address is specified. On the other hand, the facsimile device transmits the image information to a specified destination address by using the electronic-mail communication control unit 19, if the facsimile device attempts to transmit the image information to the specified destination address by using the real-time network communication control unit 20 based on a setting in the destination table 13, but cannot communicate with the other party because the line to the other party is busy. Accordingly, the facsimile device can transmit the image information to its destination address even if a communication condition to the destination address is poor.

Additionally, the electronic-mail transmission method may be set corresponding to a global address communication, in the condition table. If the electronic-mail transmission method is set in a destination table of the other party specified as a destination of the global address communication, the facsimile device transmits image information all together to the destination by using the electronic-mail communication control unit 19. Accordingly, the facsimile device can transmit the image information to a plurality of destinations at once, and, thus, can reduce a communication cost.

A plurality of the above-described conditions may be set together in the condition table. A priority order among the conditions may also be set in the condition table. In such a case, a condition using a degree of significance of a document is preferably set as the first priority. Additionally, in a case in which one of the above-described conditions is satisfied, and the facsimile device attempts to transmit image information by changing a transmission method registered in the destination table 13, the facsimile device may display the transmission method and a reason to change the transmission method on the operation displaying unit 12 or the like, thereby letting a user confirm the transmission method and the reason.

A description will now be given of a facsimile device according to a second embodiment of the present invention, with reference to FIGS. 4 and 5. It should be noted that a structure of the facsimile device according to the second embodiment is almost same as that of the facsimile device according to the first embodiment, and, thus, only a part peculiar to the second embodiment will be described with reference to FIG. 1.

According to the second embodiment, as shown in FIG. 4, the destination table 13 stores a plurality of destination addresses used for transmitting image information by use of the electronic-mail transmission method, and a plurality of destination addresses used for transmitting the image information by use of the real-time transmission method. The facsimile device displays a destination number and a destination address registered in the destination table 13 when performing a facsimile transmission, and makes a user select a destination (a transmission method).

Figure 5:
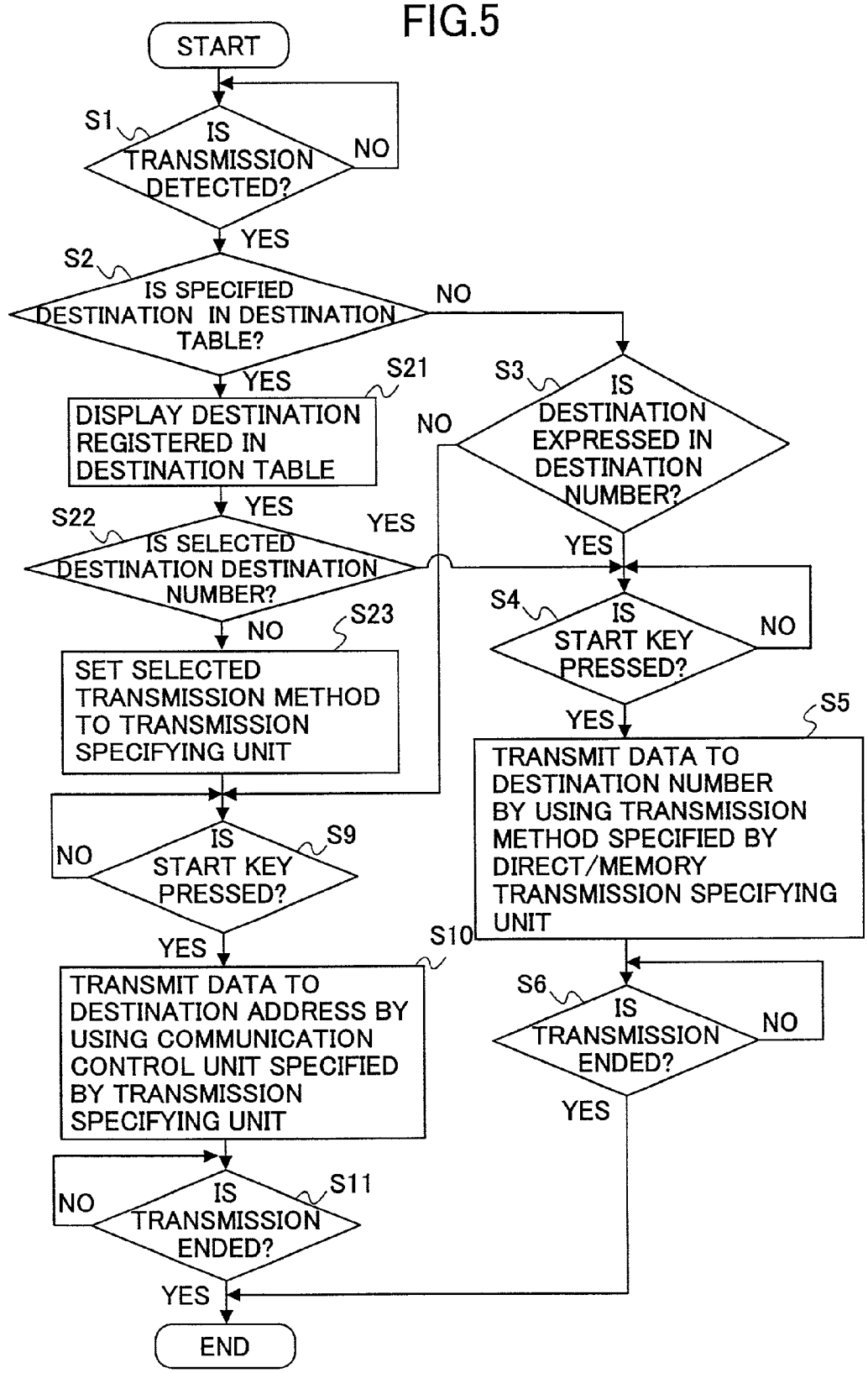
FIG. 5 is a flowchart showing processes performed by the facsimile device according to the second embodiment.

FIG. 5 is a flowchart showing processes performed by the facsimile device according to the second embodiment, and includes steps S21, S22 and S23 instead of the steps S7 and S8 shown in FIG. 3.

In detail, the system control unit 1 of the system control unit 1 determines whether transmission is detected, at the step S1. If the transmission is detected at the step S1, the system control unit 1 proceeds to the step S2, and checks whether a destination such as a one-touch dial or a speed dial registered in the destination table 13 is specified through the operation displaying unit 12. If a destination registered in the destination table 13 is specified at the step S2, the system control unit 1 proceeds to the step S21.

At the step S21, the system control unit 1 displays a list of a destination number on the telephone line network 16, a destination address used in the electronic-mail transmission method and a destination address used in the real-time transmission method, that correspond to the destination specified in the destination table 13, and makes a user select a transmission method. After the destination is selected at the step S21, the system control unit 1 determines whether the selected destination is the destination number, at the step S22. If it is determined at the step S22 that the selected destination is not the destination number, the destination is a destination address. The system control unit 1, then, sets the selected transmission method to the network-transmission-method specifying unit 14, and displays the selected transmission method, at the step S23.

Subsequently, after the start key for transmission is pressed at the step S9, the system control unit 1 transmits image information to the destination address through the computer network 17 by use of one of the electronic-mail communication control unit 19 and the real-time network communication control unit 20 specified by the network-transmission-method specifying unit 14, at the step S10. At the step S11, the system control unit 1 checks whether the transmission is completed. If it is determined at the step S11 that the transmission is completed, the facsimile device finishes the above-described processes.

If it is determined the step S2 that the specified destination is not in the destination table 13, the system control unit 1 proceeds to the step S3. The system control unit 1 determines whether the specified destination is a destination number, at the step S3. If it is determined at the step S3 that the specified destination is not the destination number, the system control unit 1 proceeds to the step S9. On the other hand, if it is determined at the step S3 that the specified destination is the destination number, the system control unit 1 proceeds to the step S4.

At the step S4, the system control unit 1 checks whether the start key for transmission is pressed. If the start key is pressed at the step S4, the system control unit 1 transmits the image information to the destination number through the telephone line network 16 by use of the facsimile-communication control unit 9 and a transmission method specified by the direct-transmission/memory-transmission specifying unit 15, at the step S5. At the step S6, the system control unit 1 checks whether the transmission is completed. If it is determined at the step S6 that the transmission is completed, the facsimile device finishes the above-described processes.

If the destination selected at the step S22 is the destination number, the system control unit 1 proceeds to the step S4. If the start key is pressed at the step S4, the system control unit 1 transmits the image information to the destination number through the telephone line network 16 by use of the facsimile-communication control unit 9 and a transmission method specified by the direct-transmission/memory-transmission specifying unit 15, at the step S5. At the step S6, the system control unit 1 checks whether the transmission is completed. If it is determined at the step S6 that the transmission is completed, the facsimile device finishes the above-described processes.

According to the second embodiment, the facsimile device displays a list of a destination number on the telephone line network 16, a destination address used in the electronic-mail transmission method and a destination address used in the real-time transmission method, that correspond to a specified destination in the destination table 13, and makes a user select a transmission method, in a case in which the specified destination is registered in the destination table 13. Therefore, the user can specify a transmission method as the need arises.

A description will now be given of a facsimile device according to a third embodiment of the present invention, with reference to FIGS. 6 and 7. A unit or a step shown in FIGS. 6 and 7 that corresponds to a unit or a step shown in FIGS. 1 and 3 has the same unit or step number as the unit or the step shown in FIGS. 1 and 3.

Figure 6:
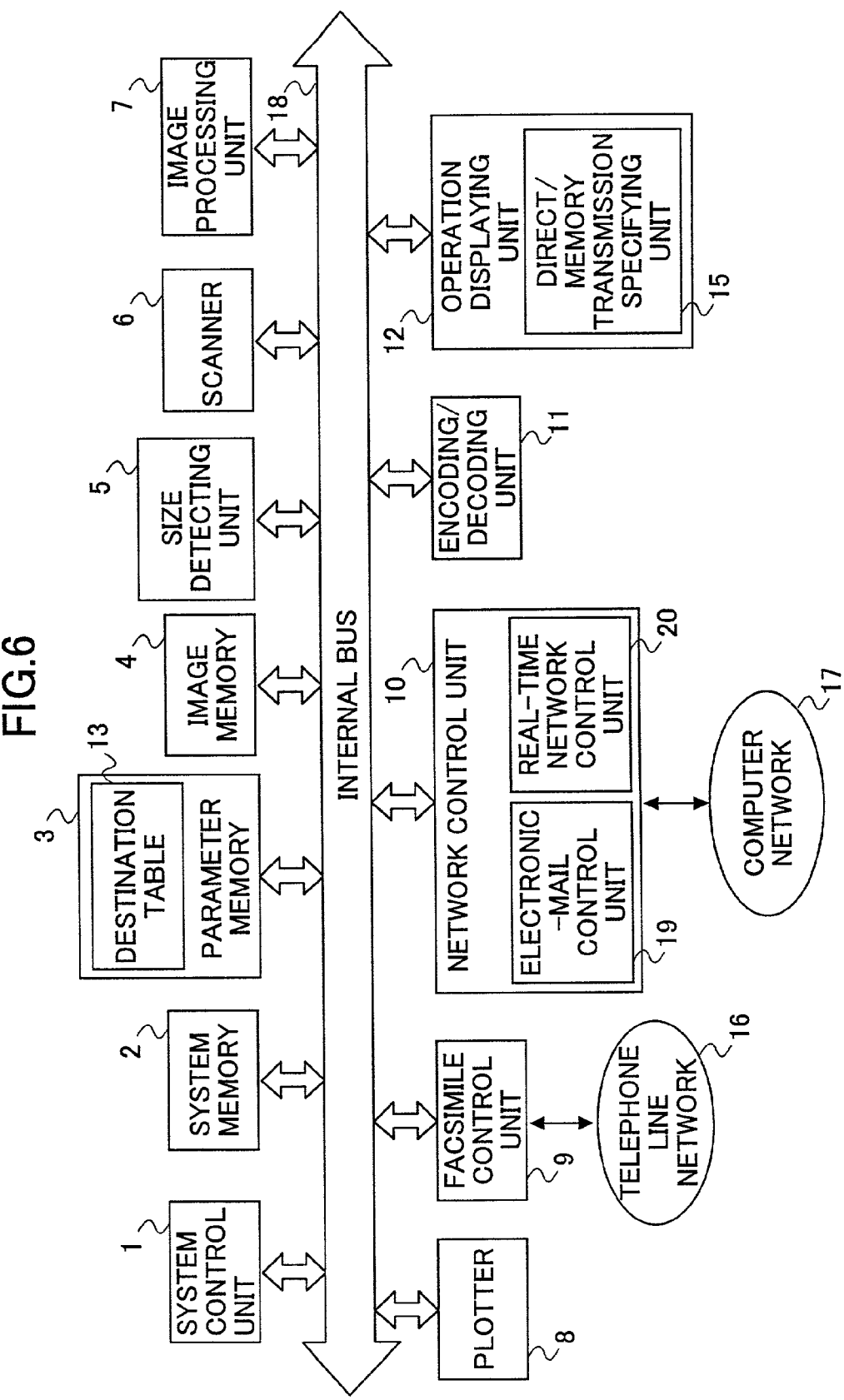
FIG. 6 is a block diagram showing a facsimile device according to a third embodiment of the present invention.

The facsimile device according to the third embodiment does not have the network-transmission-method specifying unit (the transmission specifying unit) 14, as shown in FIG. 6. The destination table 13 included in the facsimile device has the structure shown in FIG. 4. If a network transmission is specified, the system control unit 1 of the facsimile device decides to transmit image information by use of the electronic-mail communication control unit 19 or the real-time network communication control unit 20, based on a specification made by the direct-transmission/memory-transmission specifying unit (the direct/memory transmission specifying unit) 15.

Figure 7:
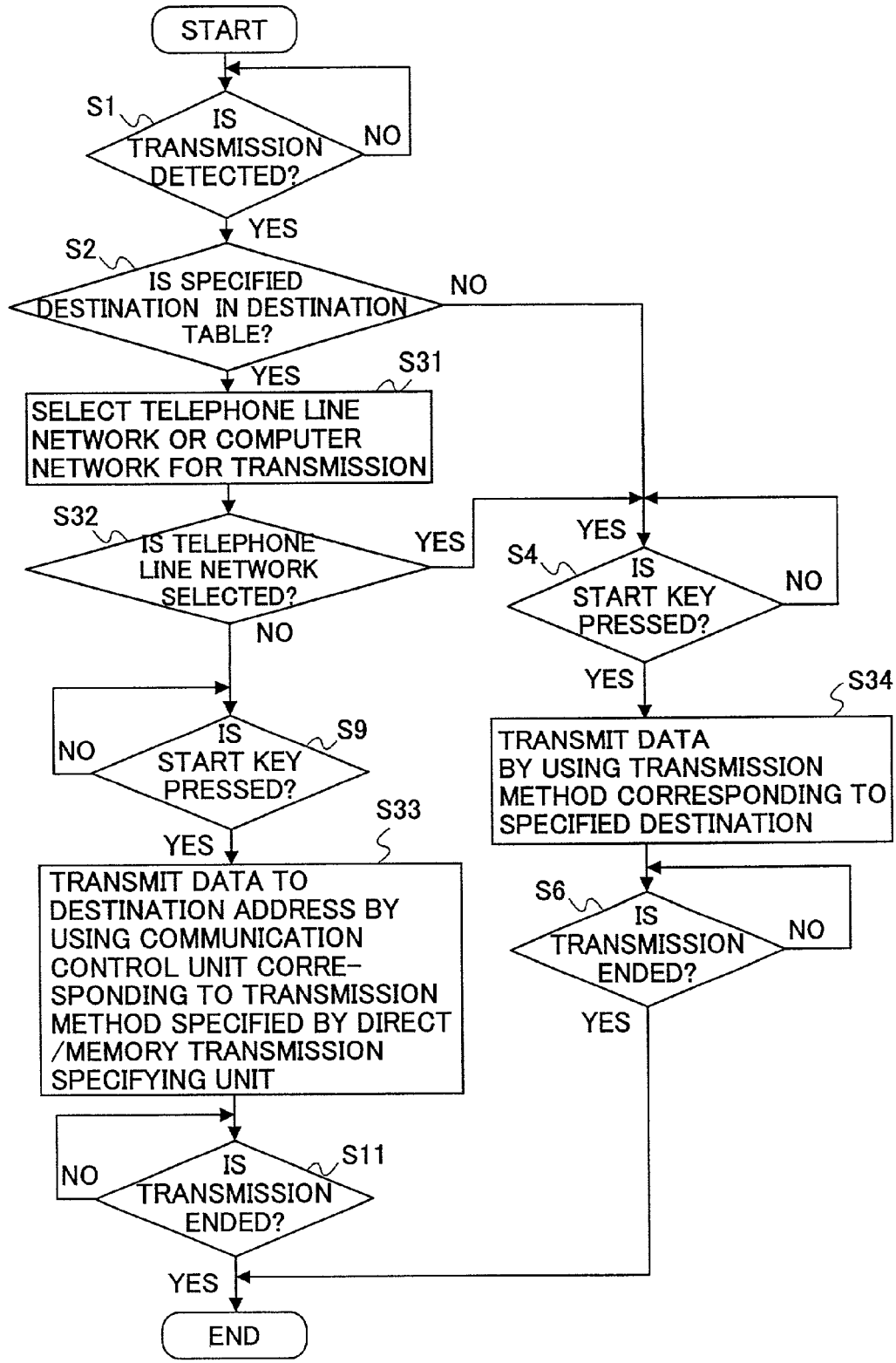
FIG. 7 is a flowchart showing processes performed by the facsimile device according to the third embodiment.

A flowchart shown in FIG. 7 includes steps S31, S32, S33 and S34 instead of the steps S7, S8, S10, S3 and S5 shown in FIG. 3. In detail, the system control unit 1 determines whether transmission is detected, at the step S1. If it is determined at the step S1 that the transmission is detected, the system control unit 1 proceeds to the step S2, and determines whether a destination such as a one-touch dial or a speed dial registered in the destination table 13 is specified through the operation displaying unit 12.

If the destination registered in the destination table 13 is specified at the step S2, the system control unit 1 proceeds to the step S31, and makes a user select transmission of the image information through the telephone line network 16 or the computer network 17. At the step S32, the system control unit 1 determines whether the telephone line network 16 is selected by the user at the step S31. If it is determined at the step S32 that the computer network 17 is selected by the user, the system control unit 1 proceeds to the step S9, and checks whether the start key for transmission is pressed. If the start key is pressed at the step S9, the system control unit 1 proceeds to the step S33.

At the step S33, the system control unit 1 transmits the image information to a destination address such as an IP address of the destination through the computer network 17 by use of the real-time network communication control unit 20, if a transmission method selected by the direct-transmission/memory-transmission specifying unit 15 is a direct transmission specification. On the other hand, the system control unit 1 transmits the image information to a destination address such as an electronic-mail address of the destination through the computer network 17 by use of the electronic-mail communication control unit 19, if the transmission method selected by the direct-transmission/memory-transmission specifying unit 15 is a memory transmission specification. Subsequently, at the step S11, the system control unit 1 checks whether the transmission is completed. If it is determined at the step S11 that the transmission is completed, the facsimile device finishes the above-described processes.

If it is determined at the step S2 that the specified destination is not registered in the destination table 13, the system control unit 1 proceeds to the step S4. Additionally, if it is determined at the step S32 that the telephone line network 16 is selected by the user, the system control unit 1 proceeds to the step S4. At the step S4, the system control unit 1 checks whether the start key for transmission is pressed. If the start key is pressed at the step S4, the system control unit 1 transmits the image information to the specified destination by using its corresponding transmission method, at the step S34, for example, by use of the facsimile-communication control unit 9 if the specified destination is a telephone number, the electronic-mail communication control unit 19 if the specified destination is an electronic-mail address, or the real-time network communication control unit 20 if the specified destination is a real-time type address. Subsequently, at the step S6, the system control unit 1 checks whether the transmission is completed. If it is determined at the step S6 that the transmission is completed, the facsimile device finishes the above-described processes.

According to the third embodiment, the facsimile device decides to transmit the image information by use of the electronic-mail communication control unit 19 or the real-time network communication control unit 20, depending on a transmission method specified by the direct-transmission/memory-transmission specifying unit 15. Thus, the facsimile device according to the third embodiment can eliminate the network-transmission-method specifying unit 14.

Figure 8:
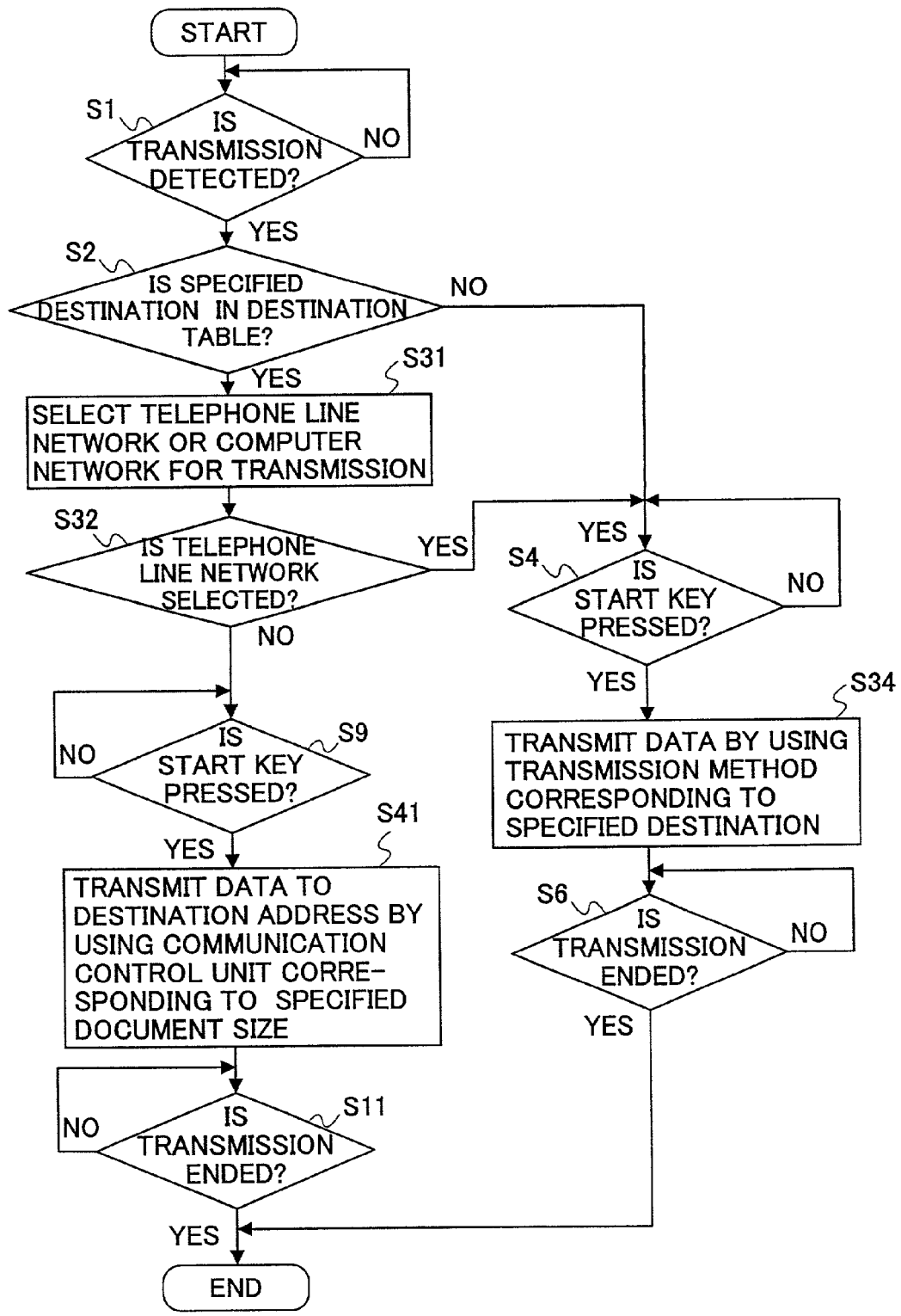
FIG. 8 is a flowchart showing a modification made to the processes performed by the facsimile device according to the third embodiment.

FIG. 8 is a flowchart showing a modification made to the processes performed by the facsimile device according to the third embodiment. In the flowchart shown in FIG. 8, a step S41 is substituted for the step S33 in the flowchart shown in FIG. 7. After the start key is pressed at the step S9, the system control unit 1 proceeds to the step S41.

At the step S41, the system control unit 1 transmits the image information to a destination address through the computer network 17, by use of the electronic-mail communication control unit 19 for the purpose of transmitting the image information by use of an electronic-mail format normally having a function to receive an A4-size document, if a transmitting document size specified through the operation displaying unit 12 is A4. On the other hand, the system control unit 1 transmits the image information to the destination address through the computer network 17 by use of the real-time network communication control unit 20, if the transmitting document size specified through the operation displaying unit 12 is other than A4. Subsequently, at the step S11, the system control unit 1 checks whether the transmission is completed. If it is determined at the step S11 that the transmission is completed, the facsimile device finishes the above-described processes.

Accordingly, an A4-size document transmitted from the facsimile device on a transmitting side can be received and outputted using the A4 size by the facsimile device on a receiving side.

Figure 9:
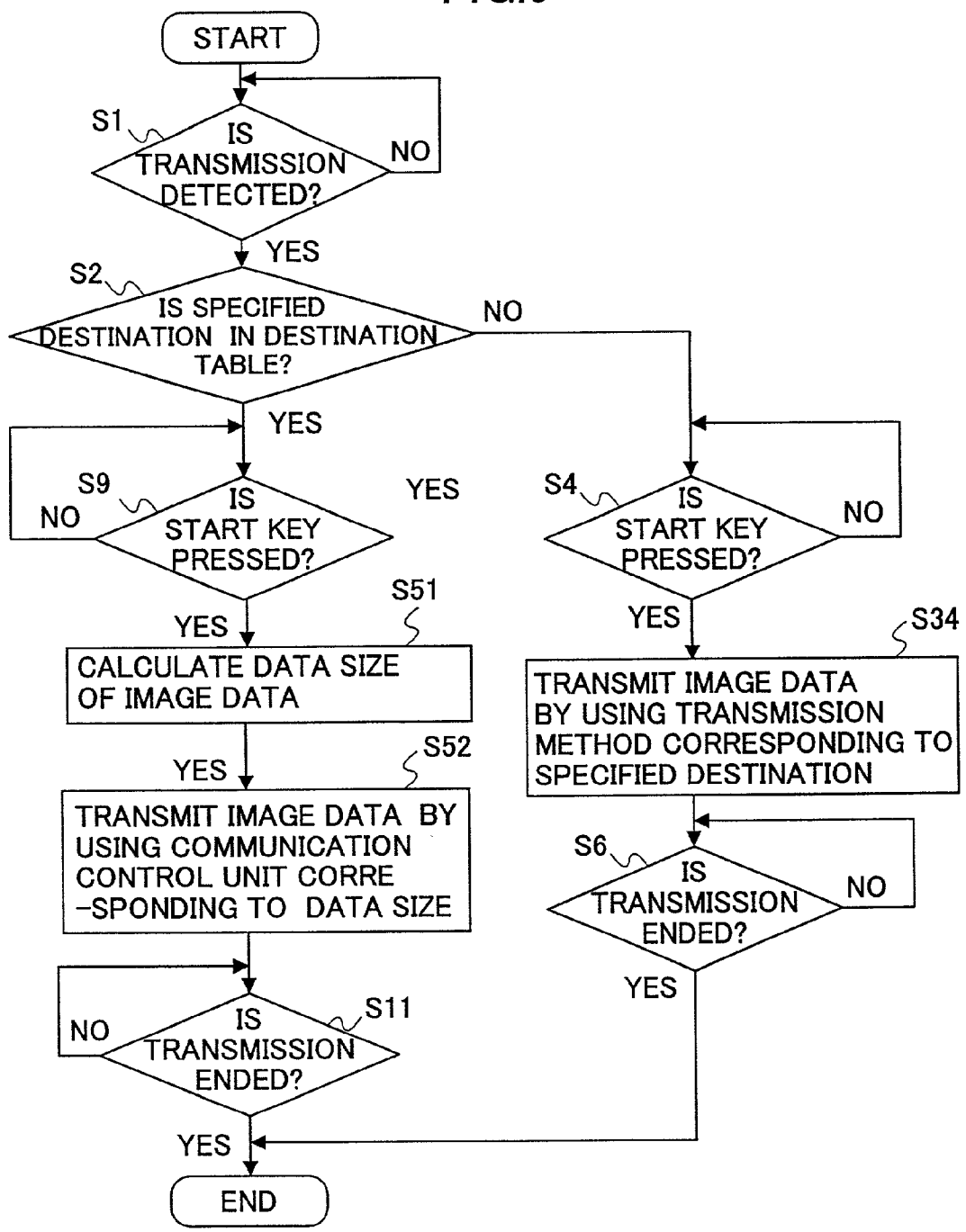
FIG. 9 is a flowchart showing processes performed by a facsimile device according to a fourth embodiment of the present invention.

FIG. 9 is a flowchart showing processes performed by a facsimile device according to a fourth embodiment, and includes steps S51 and S52 peculiar to the fourth embodiment. The facsimile device according to the fourth embodiment has a structure almost same as that of the facsimile device according to the third embodiment, and, thus, a description will be given of only a part peculiar to the fourth embodiment, with reference to FIG. 6.

In detail, the system control unit 1 determines whether transmission is detected, at the step S1. If it is determined at the step S1 that the transmission is detected, the system control unit 1 proceeds to the step S2, and determines whether a destination such as a one-touch dial or a speed dial registered in the destination table 13 is specified through the operation displaying unit 12. If the destination registered in the destination table 13 is specified at the step S2, the system control unit 1 proceeds to the step S9, and checks whether the start key for transmission is pressed. If the start key is pressed at the step S9, the system control unit 1 proceeds to the step S51.

At the step S51, after reading a document by use of the scanner 6, the system control unit 1 calculates a data size of image data (image information) read by the scanner 6 from the document. If the data size of the image data is larger than a predetermined data size, and a transmission method selected by the direct-transmission/memory-transmission specifying unit 15 is the direct transmission specification, the system control unit 1 transmits the image data to a destination address corresponding to the destination through the computer network 17, by use of the real-time network communication control unit 20, at the step S52. If the data size of the image data is larger than the predetermined data size, and the transmission method selected by the direct-transmission/memory-transmission specifying unit 15 is the memory transmission specification, the system control unit 1 transmits the image data to the destination address through the computer network 17, by use of the electronic-mail communication control unit 19, at the step S52.

On the other hand, if the data size of the image data is less than or equal to the predetermined data size, the system control unit 1 transmits the image data to a destination number corresponding to the destination through the telephone line network 16, by use of the facsimile-communication control unit 9, at the step S52. At the step S11 following the step S52, the system control unit 1 checks whether the transmission is completed. If it is determined at the step S11 that the transmission is completed, the facsimile device finishes the above-described processes.

If it is determined at the step S2 that the specified destination is not registered in the destination table 13, the system control unit 1 proceeds to the step S4. At the step S4, the system control unit 1 checks whether the start key for transmission is pressed. If the start key is pressed at the step S4, the system control unit 1 transmits the image information to the specified destination by using its corresponding transmission method, at the step S34, for example, by use of the facsimile-communication control unit 9 if the specified destination is a telephone number, the electronic-mail communication control unit 19 if the specified destination is an electronic-mail address, or the real-time network communication control unit 20 if the specified destination is a real-time type address. Subsequently, at the step S6, the system control unit 1 checks whether the transmission is completed. If it is determined at the step S6 that the transmission is completed, the facsimile device finishes the above-described processes.

According to the fourth embodiment, the facsimile device decides to transmit image data read from a document through the telephone line network 16 or the computer network 17, based on a data size of the image data. Thus, the facsimile device according to the fourth embodiment can eliminate a process to specify a transmission method for each transmission.

As described above, the facsimile device according to the present invention has the network-transmission-method specifying unit 14 used for specifying a transmission method, that is, either the electronic-mail transmission method or the real-time transmission method in a case of transmitting image information through a computer network, and, thus, a user can specify the transmission method as the need arises. Consequently, the present invention improves convenience of the facsimile device.

Additionally, the facsimile device has a destination table, to which the facsimile device can register a destination number for calling through a telephone line network or a destination address for transmitting image information through the computer network for each destination, and information about transmitting the image information by using the electronic-mail transmission method or the real-time transmission method for each destination address. Thus, the facsimile device according to the present invention can eliminate a process to specify the transmission method. Consequently, the present invention improves the convenience of the facsimile device.

If a destination address registered in the destination table is specified as a destination, the facsimile device sets a transmission method that is registered in the destination table and corresponds to the destination address, to the network-transmission-method specifying unit 14, and displays the transmission method. Thus, a user can change the transmission method before transmission of the image information, as the need arises. Consequently, the present invention improves the convenience of the facsimile device.

The facsimile device according to the present invention has a condition table that allows registration of a transmission method for each predetermined condition, in the destination table, and transmits image information by selecting a transmission method corresponding to a predetermined condition in the condition table as a first priority if the predetermined condition is detected. Consequently, the present invention can set a transmission method for every kind of conditions, and thus, the present invention improves the convenience of the facsimile device.

For instance, by using a document size of a document to be transmitted as a predetermined condition, the facsimile device can select a transmission method, by which the facsimile device can accurately transmit the document by using the document size. Therefore, the present invention improves the convenience of the facsimile device.

In addition, by using a destination address as a predetermined condition, the facsimile device can select a transmission method, by which the facsimile device can accurately transmit image information to the destination address. Therefore, the present invention improves the convenience of the facsimile device.

In addition, by using a data size of image data read from a document as a predetermined condition, the facsimile device can select a transmission method that minimizes a transmission cost of large-sized image data.

In addition, by using a degree of significance of a document as a predetermined condition, the facsimile device can transmit a highly significant document accurately. Therefore, the present invention improves the convenience of the facsimile device.

In addition, by using a condition of the computer network as a predetermined condition, the facsimile device can change a transmission method in a case in which the condition of the computer network is poor. Therefore, the present invention improves the convenience of the facsimile device.

Further, by using a global address communication as a predetermined condition, the facsimile device can select a transmission method that minimizes a cost of the global address transmission.

Additionally, the facsimile device according to the present invention does not need a special network-transmission-method specifying unit by substituting the direct-transmission/memory-transmission specifying unit 15 for the network-transmission-method specifying unit 14. Thus, the present invention can cut a cost for manufacturing the facsimile device. In such a case, a function of the facsimile device can be easily understood, by making the direct transmission specification correspond to the real-time transmission, and the memory transmission specification correspond to the electronic-mail transmission, when transmitting image information to a destination address by use of the direct-transmission/memory-transmission specifying unit 15. Therefore, the present invention improves the convenience of the facsimile device.

Additionally, the facsimile device displays a destination number and a destination address registered in the destination table in a case in which the destination address registered in the destination table is specified as a destination, and makes a user select a either of the destination number and the destination address. Thus, the user can specify a transmission method as the need arises, and the present invention improves the convenience of the facsimile device.

Additionally, the facsimile device selects a transmission method to a network based on a document size specified by the document-size detecting unit 5, and, thus, the facsimile device can select a transmission method, by which the facsimile device can transmit a document by using the document size specified by the document-size detecting unit 5. Therefore, the present invention improves the convenience of the facsimile device.

By setting the facsimile device on a transmitting side to transmit an A4-size document by use of the electronic-mail communication control unit 19, the facsimile device on a receiving side can output the A4-size document as it is, since the electronic-mail transmission method includes a function to receive and output any A4-size documents. Therefore, the present invention improves the convenience of the facsimile device.

Additionally, the facsimile device selects a transmission method to a network based on a destination address of a destination specified by a user if the destination is not registered in the destination table. Thus, the facsimile device does not need to include the network-transmission-method specifying unit 14, thereby reducing a cost of manufacturing the facsimile device. In such a case, the facsimile device can instantaneously check whether image information is transmitted to its destination address correctly, by setting the facsimile device to transmit the image information by use of the real-time network communication control unit 20 if the destination address is a local address. Therefore, the present invention improves the convenience of the facsimile device.

Additionally, the facsimile device selects a transmission method to a network based on a data size of image data read from a document, and, thus, the facsimile device does not need any special network-transmission-method specifying units. Consequently, a cost of manufacturing the facsimile device can be reduced. In such a case, a transmission function of the facsimile device can be easily understood, by transmitting image information by use of one of the electronic-mail communication control unit 19 and the real-time communication control unit 20 if the data size of the image data exceeds a predetermined data size.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Applications No. 2000-129161, filed on Apr. 28, 2000, and No. 2001-085351, filed on Mar. 23, 2001, the entire contents of which are hereby incorporated by reference.

What is claimed is:

1. A facsimile device that transmits image information to a destination, comprising:
   an electronic-mail control unit used for transmitting the image information in an electronic-mail format to said destination through a computer network;
   a real-time network control unit used for transmitting the image information to said destination while said facsimile device and said destination are connected on line through the computer network; and
   a destination table, to which a destination address and a transmission method are registered, said transmission method being registered respectively for each destination address, said destination address being used for transmitting the image information through the computer network, said transmission method indicating one of said electronic-mail control unit and said real-time network control unit,
   wherein said facsimile device transmits the image information to said destination address by use of either said electronic-mail control unit or said real-time network control unit indicated by said transmission method if said destination address is specified as the destination.

2. The facsimile device as claimed in claim 1, further comprising a facsimile control unit used for transmitting the image information to the destination through a telephone line network by following a fixed facsimile transmission procedure, wherein said facsimile device registers a destination number or the destination address, for said each destination, and the transmission method for said each destination address, in said destination table, said destination number being used for transmitting the image information through the telephone line network.

3. The facsimile device as claimed in claim 1, further comprising a transmission specifying unit specifying either said electronic-mail control unit or said real-time network control unit, wherein said facsimile device sets the transmission method corresponding to said destination address, to said transmission specifying unit, switches said transmission method by using said transmission specifying unit if necessary, and transmits the image information to said destination address by use of either said electronic-mail control unit or said real-time network control unit specified by said transmission specifying unit.

4. The facsimile device as claimed in claim 1, wherein said destination table includes a first table, to which the transmission method is registered for said each destination, and a second table, to which the transmission method is registered for each predetermined condition, and said facsimile device transmits the image information to said destination address by using said transmission method registered in said second table as a first priority if a predetermined condition is detected.

5. The facsimile device as claimed in claim 4, further comprising a document-size detecting unit detecting a document size of a document, wherein said facsimile device registers said document size as the predetermined condition, and determines the transmission method according to said document size.

6. The facsimile device as claimed in claim 4, wherein said facsimile device registers a value of said destination address as the predetermined condition, and determines the transmission method according to said value of the destination address.

7. The facsimile device as claimed in claim 4, wherein said facsimile device registers a data size of the image information as the predetermined condition, and determines the transmission method according to said data size.

8. The facsimile device as claimed in claim 4, further comprising a significance specifying unit specifying a degree of significance of a document, wherein said facsimile device registers the degree of significance of the document as the predetermined condition, and determines the transmission method according to said degree of significance if said degree of significance of the document is specified by said significance specifying unit.

9. The facsimile device as claimed in claim 4, wherein said facsimile device registers a network condition of said computer network as the predetermined condition, and determines the transmission method according to said network condition.

10. The facsimile device as claimed in claim 4, wherein said facsimile device registers a broadcast communication as the predetermined condition, and determines the transmission method depending on whether said facsimile device performs the global address communication.

11. A facsimile device that transmits image information to a destination, comprising:
   an electronic-mail control unit used for transmitting the image information in an electronic-main format to said destination through a computer network;
   a real-time network control unit used for transmitting the image information to said destination while said facsimile device and said destination are connected on line through the computer network;
   a destination table, to which a destination address and a transmission method are registered, said transmission method being registered respectively for each destination address, said destination address being used for transmitting the image information through the computer network, said transmission method indicating one of said electronic-mail control unit and said real-time network control unit; and
   a facsimile control unit used for transmitting the image information to the destination through a telephone line network by following a fixed facsimile transmission procedure, wherein said facsimile device registers a destination number or the destination address, for each destination, and the transmission method for said each destination address, in said destination table, said destination number being used for transmitting the image information through the telephone line network,
   wherein said facsimile device transmits the image information to said destination address by use of either said electronic-mail control unit or said real-time network control unit indicated by said transmission method if said destination address is specified as the destination, and
   wherein said destination table stores the destination number, a first destination address used for transmitting the image information in the electronic-mail format through the computer network, and a second destination address used for transmitting die image information while said facsimile device and said destination are connected on line through the computer network, for said each destination, wherein said facsimile device displays said destination number, said first destination address and said second destination address, makes a user select one of said destination number, said first destination address and said second destination address, and transmits the image information to the destination number or the destination address selected by the user, by using one of said electronic-mail control unit and said real-time network control unit that corresponds to said destination number or said destination address selected by the user.

12. The facsimile device as claimed in claim 1, further comprising a document-size specifying unit specifying a document size of a document to be transmitted, wherein said destination table stores a first destination address used for transmitting the image information in the electronic-mail format through the computer network, and a second destination address used for transmitting the image information while said facsimile device and the destination are connected on line through the computer network, for said each destination, and said facsimile device transmits the document to said destination by use of either said electronic-mail control unit or said real-time network control unit corresponding to the document size of said document specified by said document-size specifying unit to be outputted at said destination.

13. The facsimile device as claimed in claim 12, wherein said facsimile device transmits the document to said destination by use of said electronic-mail control unit if the document size of said document is A4.

14. The facsimile device as claimed in claim 2, wherein said facsimile device transmits the image information to said destination address by use of either said electronic-mail control unit or said real-time network control unit corresponding to said destination address, if said destination address is specified as the destination, and said transmission method is not registered in said destination table.

15. The facsimile device as claimed in claim 14, wherein said facsimile device transmits the image information to said destination address by use of said real-time network control unit if said destination address is a local address.

16. The facsimile device as claimed in claim 2, wherein said facsimile device calculates a data size of the image information read from a document, and transmits the image information to said destination by use of either said electronic-mail control unit or said real-time network control unit corresponding to said data size.

17. A method of selecting a transmission method for transmitting image information from a facsimile device to a destination, comprising the steps of:
   registering a destination number used for transmitting the image information through a telephone line network or a destination address used for transmitting the image information through a computer network, for each destination in a destination table;
   registering a transmission method, that is, one of an electronic-mail transmission method and a real-time transmission method, for each destination address registered in said destination table; and
   transmitting the image information to the destination address by use of the transmission method corresponding to said destination address, if said destination address is specified as the destination.

18. The method as claimed hi claim 17, further comprising the steps of:
   setting the transmission method corresponding the destination address, if said destination address is specified as the destination;
   switching the transmission method if necessary; and
   transmitting the image information to said destination address by use of said transmission method.

* * * * *